United States Patent [19]

Talbott et al.

[11] Patent Number: 4,664,856

[45] Date of Patent: May 12, 1987

[54] METHOD OF TREATING MATERIALS TO IMPROVE THEIR CONDUCTANCE FOR USE IN THE MANUFACTURE OF DIRECTIONALLY ALIGNED MATERIALS

[75] Inventors: John W. Talbott, Latah County, Id., by Jeanette I. Talbott, administrator; Thomas E. Peters, Ada County, Id.; James D. Logan, Whitman County, Wash.

[73] Assignee: Morrison-Knudsen Forest Products, Inc., Boise, Id.

[21] Appl. No.: 686,840

[22] Filed: Dec. 27, 1984

[51] Int. Cl.$^4$ ................................................ B06B 1/02
[52] U.S. Cl. ........................................ 264/24; 162/192
[58] Field of Search ................. 425/174.8 E; 162/192; 264/24

[56] References Cited

U.S. PATENT DOCUMENTS

| | | | |
|---|---|---|---|
| 3,773,592 | 11/1973 | Nicolaus et al. | 425/174.8 E |
| 3,853,580 | 12/1974 | Gourdine | 264/24 |
| 4,284,595 | 8/1981 | Peters et al. | 264/24 |
| 4,287,140 | 9/1981 | Peters et al. | 264/24 |
| 4,323,338 | 4/1982 | Peters et al. | 425/174.8 E |
| 4,432,916 | 2/1984 | Logan | 264/24 |

*Primary Examiner*—Jan H. Silbaugh
*Assistant Examiner*—Hubert C. Lorin
*Attorney, Agent, or Firm*—Seed and Berry

[57] ABSTRACT

A method is disclosed for treating discrete pieces of material, particularly pieces of lignocellulosic furnish, to ensure adequate conductance thereof for orientation in an electric field for electrostatic alignment. The furnish is exposed to a conductance-improving substance of substances, such as an alkali or alkaline earth metal salts of weak acid, quaternary ammonium salts, or gases such as ammonia, chlorine, sulfur dioxide, etc. prior to being subjected to the electric field.

11 Claims, No Drawings

METHOD OF TREATING MATERIALS TO IMPROVE THEIR CONDUCTANCE FOR USE IN THE MANUFACTURE OF DIRECTIONALLY ALIGNED MATERIALS

TECHNICAL FIELD

This invention relates to a method of treating particulate fibrous materials prior to electrostatic alignment thereof to ensure adequate and more uniform conductance of the material.

BACKGROUND ART

Directionally oriented products of reconstituted lignocellulose materials, such as strands, splinters, flakes, particles, fibers, etc., are desirable for structural purposes. The production of directionally oriented products from lignocellulose materials by electrostatic orientation of discrete pieces of the lignocellulosic material are described in U.S. Pat. Nos. 4,287,140 and 4,323,338. In a total system, the lignocellulosic material is dried to a moisture content of between 2-8% on a dry weight basis, blended with a resin such as a urea formaldehyde, or phenolformaldehyde or isocyanate resin, passed into a former which meters approximate amounts of the lignocellulosic material between spaced electrically charged plates for alignment of the particles in the direction of the electric field as they descend by gravity between the spaced plates and are deposited in aligned condition on a mat-receiving surface for later consolidation under heat and pressure in a press.

Orientation of lignocellulosic materials in an electric field is more effective where the lignocellulosic materials have a conductance of at least about 500 femto-Siemens (fS) or $500 \times 10^{-15}$ Siemens. As used herein, conductance is defined as the reciprocal of electrical resistance of the particle. It is recognized that conductivity, rather than conductance, may be a more proper measurement; however, conductance was used. Where the term "conductance is used herein, the term refers to measurements which were taken by means of a pair of biased metallic electrical contacts placed at a distance of about 10 mm along the major axis of the elongated particle material pieces. An electric potential, V, was placed between the contacts, and the electric current, I, flowing from one contact through the particle to the other contact was measured.

Conductance G was calculated from the formula:

$$G \times I/V$$

Conductivity could be calculated from:

$$\sigma = GL/(wh),$$

where L is the distance between the contacts, and w and h are the width and thickness, respectively, of the particle.

Since for particles considered here, the term (L/wh) varied over a range of about 10:1, and the conductance G varied over a much wider range (often in excess of 10,000:1), it was convenient to ignore the effect of particle geometry (L/wh), and report only the conductance. Particle geometries were within a typical range for all particle pieces considered.

Lignocellulosic furnishes from commercial board plants generally include discrete particles with a wide range of conductance, much of which are substantially below the 500 fS limit for adequate orientation. This results in reduced effectiveness of orientation and problems of particles clinging to charged surfaces in the equipment. While conductance can be improved by increasing the moisture content of the lignocellulosic furnish, too high a moisture content in the furnish cannot be tolerated in the pressing operation.

In a commercial board plant where the time lapse between the drying, blending and forming operations is generally only a few minutes, the conductance of the lignocellulosic particles making up the furnish must be brought within the appropriate range for electrostatic orientation very quickly after the drying operation. During a typical drying operation, a portion of the furnish becomes overheated and overdried and rapidly loses conductance as its temperature is reduced after leaving the dryer. A gradual increase in conductance occurs as the furnish equilibrates with the moisture in the environment; however, the time lag to do so is far too long for consideration in a commercial board operation. Application of resin during the blending operation also enhances the conductance of the furnish by increasing the moisture content and by the presence of possible ionic materials in the resin; however, the conductance is generally only improved marginally. Since resin and moisture are not generally well distributed in blending, the conductance of the particles varies over an extremely wide range.

A wood flake having a thickness, for example, of about 0.015 inch, will equilibrate in temperature in about one minute, its conductance increasing with temperature. The moisture content will equilibrate in about one hour with the conductance increasing steeply as the moisture content increases. Heating of wood flakes, for example, to 400° F. decreases the actual hygroscopicity of the wood so that when the flake is returned to a moist atmosphere at room temperature the conductance will increase from below 1 fS to a new equilibrium value in about an hour; however the equilibrium value will be one to two orders of magnitude lower than the measured conductance of the flake before heating. The flake will not recover its former degree of hygroscopicity. Drying wood flakes to a very low moisture content even at room temperature reduces the conductance of those flakes to less than 1 fS with very slow recovery. Flakes which are dried to such a low moisture content and then equilibrated at 38% relative humidity do not reach a suitable range of conductance for adequate electrostatic orientation for several days.

What is needed is a means of ensuring an adequate conductance of fibrous particles for making up consolidated articles, including overdried particles, at the time of forming or before, without increasing the moisture content of the furnish.

DISCLOSURE OF THE INVENTION

It is a primary object of this invention to provide a method of treating fibrous materials (flakes, particles, flakes, strands and fibers) to ensure an adequate conductance of the materials in the furnish, including overdried materials, at or before the time of forming the material, without increasing the moisture content thereof.

It is a further object of this invention to provide a method for treating lignocellulose materials to ensure adequate conductance of lignocellulosic materials for use in electrostatic alignment equipment in the production of directionally aligned materials.

It is a further object of this invention to provide a method of treating lignocellulosic materials for electrostatic orientation an electric field so that the lignocellulosic materials have an average conductance above about 500 fS.

These and other objects are accomplished by exposing the fibrous material before or after drying, and before electrostatic alignment thereof, to a conductance-enhancing substance or substances which enhance the conductance thereof and thereby enhancing the effective alignment efficiency of the lignocellulosic materials when subjected to an electrostatic field.

BEST MODE FOR CARRYING OUT INVENTION

The method described herein is applicable to the treatment of discrete particles of lignocellulosic material such as flakes, strands, chips, wafers, shavings, slivers, fibers, etc., particularly lignocellulosic materials. The alignment efficacy of the lignocellulosic materials is best enhanced using lignocellulosic materials having a moisture content of between 4–20% by weight on an oven-dry basis. Though the preferred lignocellulosic material is wood, other lignocellulosic materials such as straw, grass, bagasse, and other fibrous materials (such as glass fibers) may be used depending on their availability and the type of end product desired.

To ensure an adequate conductance of the lignocellulosic particles in a furnish thereof, the particles are treated with the material or materials, before or after drying, to improve their conductance as well as improve the uniformity of their conductance.

Ideally, the conductance-improving substance or substances should (1) be easy to apply, (2) be non-toxic, (3) not hinder cure of the resin applied to the particles or the bond strength, and (4) not degrade the final properties of the end product. No one substance meets all of the above; however, the substance or substances should be chosen with the above in mind.

The substance or substances may be applied to the fibrous material prior to or after drying, prior to or after subjecting the material to cutting, shearing, flaking or other operation, and before, during or after blending of the lignocellulosic materials with resin. It is preferred, however, to apply the conductance-enhancing substance or substances after drying and before blending.

Substances which can be used include a wide variety of chemical compounds or mixtures of such compounds which have an effect of improving the conductance of the furnish. Such compounds include salts of weak acids, such as the alkali and alkaline earth metal carbonates, acetates, borates; gases which ionize in water, such as chlorine, sulfur, dioxide, ammonia etc; ammonium salts of weak acids such as ammonium carbonate or ammonium acetate; and quaternary ammonium salts, such as those having the general formula

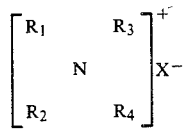

where
X=halide or $CH_3SO_4$,
$R_1$ and $R_2 = C_{8-22}$ alkyl radicals,
$R_3$ and $R_4 = C_{1-4}$ alkyl radicals.

Specific quaternary ammonium compounds which may be used include, for example di(hydrogenated tallow)dimethylammonium chloride (Arquad 2 HT-75); dioctadecyldimethylammonium chloride; and polyethoxylatedstearylmethylammonium chloride. The substance or substances may be applied in different forms: (1) in molten or emulsion form, (2) in solution in a solvent therefor, or (3) as a gas (in the case of ammonia).

Treatment with gaseous ammonia or other conductance-enhancing gaseous compound or compounds is an ideal way to enhance the orientability of lignocellulosic materials in that it is quick, effective and inexpensive. It leaves no residue on the formed board, is not corrosive to iron (in the case of ammonia), and does not increase the moisture content of the furnish.

The amount of the conductance-enhancing substance or substances applied to the lignocellulosic materials should be sufficient to improve the conductance of the furnish to about 500 fS, and generally ranges from 0.005–5.0% by weight based on the weight of the lignocellulosic material.

The following examples are illustrative of the invention, but are not to be considered limiting.

EXAMPLE 1

Individual lignocellulosic flakes having a thickness of about 0.015 inches were treated with a 5% aqueous solution of sodium carbonate, heated to 400° F. for three minutes and then exposed to room air at 70° F. and 40% relative humidity. The flakes reached orientable conductance (greater than 500 fS) in two minutes whereas a similar flake not treated required about three hours.

EXAMPLE 2

Lignocellulosic flakes as described in Example 1 were treated with 5% aqueous solution of borax (sodium tetraborate), heated to 400° F. for three minutes, and exposed to room conditions as in Example 1. The flake reached orientable conductance in six minutes in comparison to three hours for untreated flakes.

EXAMPLE 3

Wood flakes heated to 400° F. for three minutes were treated with a 5% by wt. aqueous solution of ammonium carbonate by dipping the flakes for three seconds, in the solution and blotting them. Greater conductance was obtained than with treatment with water alone. The conductance remained stable for over an hour. When reheated to 400° F. the wood flakes returned to less than 1 fS conductance. The volatile characteristics of ammonium carbonate requires that it is applied after drying. Similar results were obtained using ammonium acetate.

EXAMPLE 4

Quaternary ammonium salts such as those previously described in this application, are widely used in fabric softening compositions or static eliminating compositions for the home laundry market. The physical properties, melting points and solubilities of such compounds are largely determined by the nature and size of the four substituents on the ammonium cation. These compounds have some degree of solubility or miscibility with both polar and nonpolar materials.

Two larch flakes were heated at 400° F. for three minutes. One was treated on one side with a slight smear of Arquad 2 HT-75 [di(hydrogenated-tallow)-dimethylammonium chloride], a waxy white solid having a melting point of about 135° F. which is essentially water insoluble, but is soluble in 2-propanol and miscible with both paraffin and microcrystalline waxes. The 2 HT-75 material was mixed with a microcrystalline wax, (Vaseline ™) and melted. The other large flake was untreated. The untreated flake had a conductance of less than 1 fS and remained at that level for over 24 hours, whereas the treated flake measured 8200 fS immediately and increased to 25,000 fS in thirty minutes, then gradually diminished to 14,000 fS in 24 hours.

EXAMPLE 5

Wood flakes heated to 400° F. were sprayed, after cooling to room temperature, with a 2-propanol solution of trimethylsoyammonium chloride (Arquad S-50), the quaternary ammonium compound present in the 2-propanol solvent in concentrations of 10%, 1%, 0.5% and 0.1% by weight The conductance levels used were sustained at room temperature for several days, but reduced to less than 1 fS on heating the wood flakes to 400° F.

EXAMPLE 6

Flakes previously heated to 400° F. for about three minutes were exposed for one minute to gaseous ammonia. This resulted in an immediate increase in the conductance of the wood flakes from less than 1 fS to 1200 fS. As a control, a similar flake was exposed for one minute to water vapor at room temperature and the conductance measured. The control flake had a conductance of about 33 fS which decreased to less than 1 fS in five minutes.

EXAMPLE 7

An aspen flake heated to 400° F. for for three minutes was weighed and placed in a chamber at atmospheric pressure to which dry ammonia gas was admitted at 70° F. while conductance was monitored. Within three seconds the conductance increased to 0.5 pS and within seven minutes leveled off about thirty pS. The flake was then removed to ambient air, reweighed and the conductance monitored. The flake picked up 4% by weight dry ammonia. The conductance of the flake reached orientable range instantly with ammonia exposure and remained 5 times the orientation minimum after 35 minutes when exposed to room air.

EXAMPLE 8

In a pilot laboratory operation, a 50:50 mixture of yellow poplar and gum wood was fed through a Hombak drum flaker, producing a mixture of 70 mm. strands. The mixture was dried to a moisture content of about 11% and divided into two batches. One batch was blended with 6% by wt. based on the weight of the furnish of a conventional phenolic resin obtained from Georgia-Pacific Corporation (G-P No. 3181) and 1% by wt. based on the weight of the furnish of a wax obtained from Borden Chemical Company (Borden EW 403H). The other batch was blended with the same amounts of resin and wax and additionally 0.5% by wt. of a 28% solution of ammonium hydroxide. Conductance measurements were made of the control batch and the batch to which the ammonium hydroxide was added about 6 minutes after removal of the respective batches from the blender. The mean conductance of the batch having no conductance-enhancing agent added was 36,800 fS, while the other batch to which ammonium hydroxide was added had a mean conductance of 164,000 fS.

The temperature of the dryer used in the above example, because of the equipment available in the laboratory, was lower than the dryer temperatures normally encountered and employed in commercial drying operations; therefore, the mean conductance of the furnish in the control sample was somewhat higher than would normally be encountered in a commercial operation.

The above experiment was repeated except that a G-P 3160 resin was used and the conductance measurements were made about 5 minutes after the blending operation. The mean conductance of the control was 40,000 fS while that of the treated batch was 116,400 fS.

I claim:

1. A method in a forming process for controlling conductance of particulate matter in a furnish thereof to enhance the orientation of the matter when subjected to an electrostatic field comprising:

exposing the matter to a conductance-enhancing substance selected from the group consisting of weak acids of alkali and alkaline earth metals, quaternary ammonium salts and gasses ionizable in water to establish the mean conductance of the furnish to above about 500 femto-Siemens prior to exposure of the matter to the electrostatic field; and aligning said furnish in said electrostatic field.

2. The method of claim 1 wherein the particulate matter is lignocellulosic materials.

3. The method of claim 1 wherein the quaternary ammonium salt has the formula:

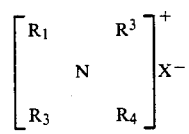

wherein:
   X = halide or $CH_3SO_4$,
   $R_1$ and $R_2 = C_{3-22}$ alkyl radicals,
   $R_3$ and $R_4 = C_{1-4}$ alkyl radicals.

4. The method of claim 1 wherein the quaternary ammonium salt is di(hydrogenated tallow)dimethylammonium chloride.

5. The method of claim 1 wherein the quaternary ammonium salt is trimethylsoyammonium chloride.

6. The method of claim 1 wherein the gas ionizable in water is selected from the group consisting of ammonia, chlorine and sulfur dioxide.

7. A method controlling conductance of the lignocellulosic materials in a furnish thereof to enhance the orientation of the materials when subjected to an electrostatic field, in a forming process comprising:

drying the furnish to a moisture content suitable for forming the furnish into a consolidated end product under heat and pressure in a pressing operation;

applying a resin to the furnish for bonding the particles of the furnish together;

applying to the furnish a conductance-enhancing substance selected from the group consisting of weak acids of alkali and earth metals, quaternary ammonium salts and gasses ionizable in water to establish the mean conductance of the furnish to above about 500 femto-Siemens; and aligning the furnish in an electrostatic field.

8. The method of claim 7 wherein the quaternary ammonium salt has the formula:

$$\begin{bmatrix} R_1 & R_3 \\ & N & \\ R_3 & R_4 \end{bmatrix}^+ X^-$$

where:

$X$ = halide or $CH_3SO_4$, $R_1$ and $R_2 = C_{3-22}$ alkyl radicals, $R_3$ and $R_4 = C_{1-4}$ alkyl radicals.

9. The method of claim 7 wherein the quaternary ammonium salt is di(hydrogenated tallow)dimethylammonium chloride.

10. The method of claim 7 wherein the quaternary ammonium salt is trimethylsoyammonium chloride.

11. The method of claim 7 wherein the gas ionizable in water is selected from the group consisting of ammonia, chlorine and sulfur dioxide.

* * * * *